Figures 1, 2, 3, 4:
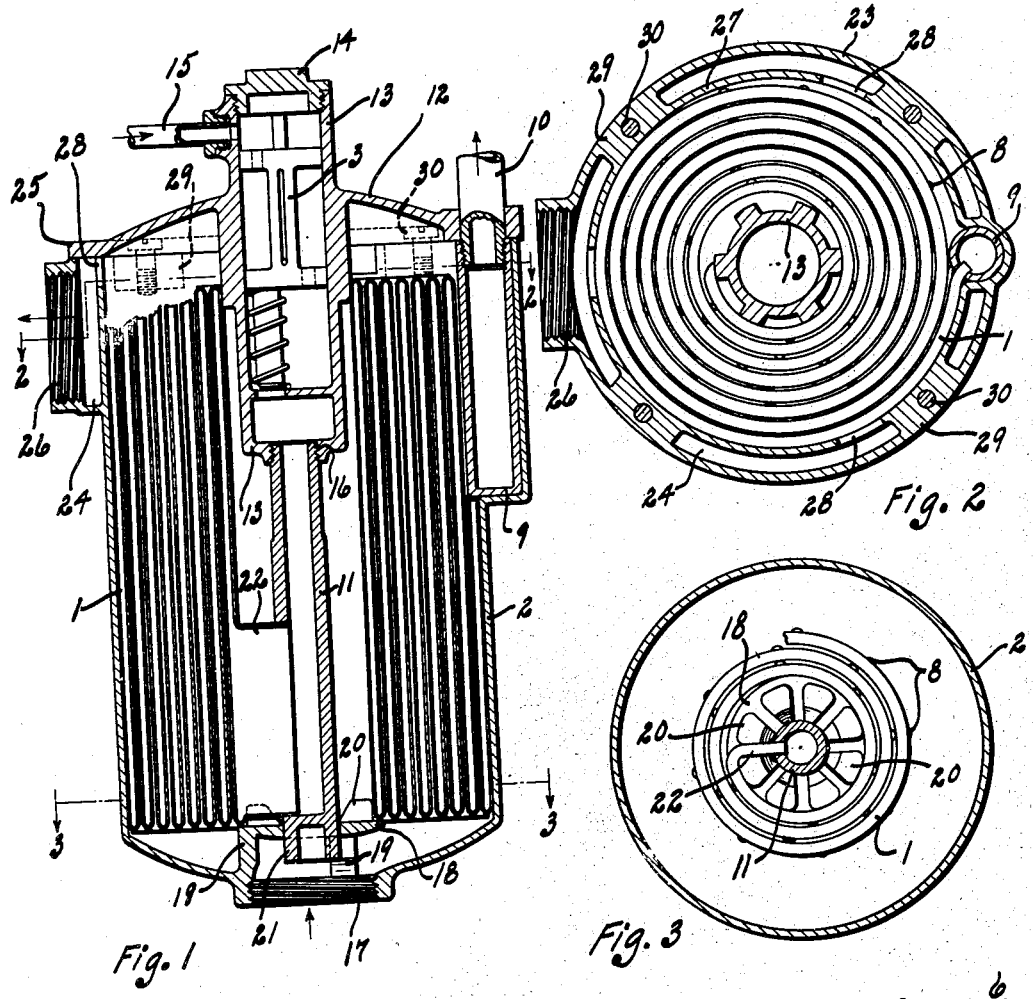

Jan. 30, 1934.   L. M. MONROE   1,945,287
OIL COOLER
Filed Aug. 12, 1932

INVENTOR
Leo M. Monroe
BY
Brockett, Hyde, Higley & Meyer
ATTORNEYS

Patented Jan. 30, 1934

1,945,287

UNITED STATES PATENT OFFICE 1,945,287

OIL COOLER

Leo M. Monroe, Cleveland Heights, Ohio

Application August 12, 1932. Serial No. 628,469

19 Claims. (Cl. 257—216)

This invention relates to heat transfer means and is particularly adapted to means for heating or cooling the lubricating oil of an internal combustion engine by means of the cooling water of the same.

Objects of the invention are to provide a device of the character described, of high efficiency, simplicity of construction, light weight, and small volume requirements, and one whose parts are easily accessible as for inspection or repair.

Another object of the invention is to provide such a heat transfer means of form adapted for combination with a filtering device included as a unit.

The exact nature of this invention together with further objects and advantages thereof will be apparent from the following description taken in connection with the accompanying drawing, in which Fig. 1 is a longitudinal sectional elevation of an embodiment of the device; Figs. 2 and 3 are transverse sections as in the planes of lines 2—2 and 3—3 respectively of Fig. 1; and Fig. 4 is an enlarged perspective view showing details of the conduit part appearing in the other figures.

With reference now to the drawing, the principal parts of the device illustrated are a conduit 1, a casing or container 2 therefor, and filter means 3.

The conduit 1 is of flat tubular section rolled upon itself to form a spiral coil of generally cylindrical shape. It is made of a pair of thin sheet metal side members 4 and 5, Fig. 4, turned in at their edges as at 6 to form spacers and welded together along their lateral extremities 7. The bends and folds are made before the assembly of parts and are made so that the extremities 7 extend slightly beyond the other parts for accessibility in welding. From Figs. 1 and 2 it will be seen that the strips from which the coil is formed are of considerable length. They are preferably rolled before welding together, so that the weld will tend to maintain the form of the coil. It will be noted that the folds at the edges insure the joint being central of the section.

The metal of the conduit coil is preferably quite thin. One or both sheets are provided with deformations which may be simply the humps 8 projecting outwardly, which serve as spacers when the coil is made by rolling the conduit upon itself, and thereafter serve as braces to prevent collapse of the coil walls under pressure either internal or external. The deformations are spaced in two directions so as to permit rolling of the coil and to allow longitudinal flow in the space between convolutions which these projections provide.

The coil is provided at its ends with connections for spiral flow therethrough. At its outer end a manifold 9 is provided for the purpose extending partway only of the length of the coil, which is the width of the conduit thereof. This manifold 9 is conveniently of soft metal cast about the coil end as indicated Fig. 2, the remainder of the coil end being closed as by welding. The near end of the manifold 9 is closed and its far end threaded for connection with a pipe 10. There is thus a narrow slot communicating between the hollow of the coil 1 and that of the manifold 9.

The convolutions of the coil provide an inner well within which a manifold 11 is secured to the inner extremity of the coil in a manner similar to the mounting of the manifold 9 upon the outer end of the coil.

The casing 2 is generally of cylindrical form to fit the coil, having a recess at its side, to receive the manifold 9, as indicated in Figs. 1 and 2. The casing is open at its end and there provided with a removable closure 12.

This closure has a cylindrical central part 13 shown in Fig. 1 extending both within and without the hollow of the casing 2 and containing the filter means generally indicated at 3. The specific details of this filtering means fully appear from my copending application Serial No. 628,470 filed of even date herewith, and are immaterial here.

The part indicated by the numeral 3 is a plunger carrying a vertically disposed filter screen element which may be movably mounted for self-cleaning operation as described in my said copending application. A cap 14 is provided for removal of the filter parts. A lateral connection 15 is provided for inlet to the filter, and a central outlet connection 16 is had from the filter to the manifold 11 of the coil 1.

11 is thus the inlet manifold of the coil and 9 the outlet manifold thereof, and both of these manifolds and thus the coil itself are secured to the closure 12 of the casing, for removal therewith as a unit.

Inlet and outlet connections for the casing are provided, and means are provided for insuring that flow through the casing will be longitudinal of the coil between the convolutions of the latter. The casing has an inlet connection 17 at its end opposite the closure 12 and thus opposite the well in the center of the coil. The upper end of this well is closed by the filter housing 13, but to close the lower end also, a baffle 18 is arranged opposite the inlet opening 17 but spaced therefrom by a plurality of legs 19, three being indicated, whereby flow into the hollow of the casing by way of the connection 17 will be against the baffle 18, thence radially outwardly, and upwardly through the convolutions of the coil.

Under operating pressures and temperatures the coil will tend to unwind. Its outer extremity is fixed by the seat of its outlet manifold 9 in the casing. Therefore to relieve its inlet connection, with the filter housing 13, the upper face of the baffle 18 is provided with a plurality of radially extending lugs 20, an extension 21 is provided on the lower end of the manifold 11, and the baffle 18 is provided with an opening to receive this extension 21. By this arrangement the neck 22 which connects the coil 1 with its inlet manifold 11, seats between a pair of these lugs 20 when the assembly is made, and the interengagement of the parts described fixes the inner end of the coil.

The casing at its other end, that adjacent the closure 12, is provided with a jacket wall 23 providing a cavity 24 thereabout opening toward the closure, which latter is provided with a flange 25 forming a closure for this cavity. The casing is provided with a lateral outlet connection 26 leading from the cavity 24. The cavity 24 is thus separated from the hollow of the casing 2 by a partition wall 27 which is merely in continuation of the general peripheral wall of the casing. This partition wall 27 is provided with openings communicating between these hollows otherwise separated by the wall. These openings are preferably in the form of notches 28 located in spaced relation about the axis of the parts. The wall 27 being thin, these notches 28 may be made by breaking from the wall and thus their size may be determined by the service which the apparatus is to meet.

Webs 29 may be provided at intervals between the walls 23 and 27, to receive screws 30 by which the closure 12 is secured in position.

Operation will be apparent.

Flow through the conduit coil will be first through the filter unit 3, thence by the manifold 11 and neck 22 spirally through the coil with the convolutions thereof, to the outlet manifold 9 and thence away by the pipe 10.

Flow of the other medium from which heat is to be obtained or to which heat is to be dissipated, will be generally through the casing longitudinal of the coil and between convolutions thereof. Specifically it will be into the casing by way of the inlet connection 17, against the baffle, spreading radially between the legs 19, longitudinally upwardly past the coil, radially outwardly through the openings 28 into the cavity 24, and through the outlet connection 26.

What I claim is:

1. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil.

2. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, said container connections being independent of said closure.

3. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, one of said connections being an end connection opposite said closure, the other being a lateral connection adjacent said closure.

4. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, one of said connections being an end connection opposite said closure, the other being a lateral connection adjacent said closure, and baffle means associated with said end connection to prevent flow therethrough central of said coil.

5. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, one of said connections being an end connection opposite said closure, the other being a lateral connection adjacent said closure, and means associated with said lateral connection to provide communication therewith peripheral of said coil.

6. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, one of said connections being an end connection opposite said closure, the other being a lateral connection adjacent said closure, baffle means associated with said end connection to prevent flow therethrough central of said coil, and means associated with said lateral connection to provide communication therewith peripheral of said coil.

7. In a heat transfer device of the character described, a container of generally cylindrical form and having a removable end closure, said container having about its closure end a jacket wall providing a cavity thereabout opening toward the closure, with a partition wall between said cavity and the hollow of said container, said partition wall having openings, a lateral external connection for said cavity, and a connection for said container hollow, whereby flow between said connections will be by way of the hollow of said container and said cavity and said openings communicating therebetween.

8. In a heat transfer device of the character described, a container of generally cylindrical form and having a removable end closure, said container having about its closure end a jacket wall providing a cavity thereabout opening toward the closure, with a partition wall between said cavity and the hollow of said container, said partition wall having openings comprising notches adjacent said closure, a lateral external connection for said cavity, and a connection for said container hollow, whereby flow between said connections will be by way of the hollow of said container and said cavity and said openings communicating therebetween.

9. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, one of said connections being an end connection opposite said closure, the other being a lateral connection adjacent said closure, and baffle means associated with said end connection to prevent flow therethrough central of said coil, said baffle means being arranged to support said coil.

10. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, one of said connections being an end connection opposite said closure, the other being a lateral connection adjacent said closure, and baffle means associated with said end connection to prevent flow therethrough central of said coil, said coil and said baffle means having parts cooperative to position the inner end of said coil against unwinding.

11. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, and filter means carried by said closure and arranged in circuit with said conduit.

12. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, and filter means carried by said closure and arranged in circuit with said conduit and extending within said coil thereof.

13. In a heat transfer device of the character described, a flat tubular conduit rolled upon itself in spiral form, a container therefor of generally cylindrical form, and having a removable end closure, said conduit having inlet and outlet connections for spiral flow therethrough, said connections being associated with said closure whereby said conduit coil is carried thereby and removable therewith, said container having connections for flow therethrough longitudinal of said conduit coil, and filter means carried by said closure and arranged in circuit with said conduit and fitting within said coil thereof.

14. In a heat transfer device of the character described, a flat tubular conduit rolled upon itself in spiral form and having pipe connections at its inner and outer ends, a container therefor having a removable end closure, said pipe connections being associated with said closure whereby said conduit coil is carried thereby and removable therewith, said container being of generally cylindrical form to fit said coil, and having a recess to receive said outer conduit connection.

15. In a heat transfer device of the character described, a flat tubular conduit rolled upon itself in spiral form, said conduit comprising a pair of walls of sheet metal having spacing folds at their edges and there joined by welding.

16. In a heat transfer device of the character described, a flat tubular conduit rolled upon itself in spiral form, said conduit comprising a pair of walls of sheet metal having their edges folded back upon the inner surface of the walls for spacing purposes and said folded portions being joined together.

17. In a heat transfer device of the character described, the combination of a flat tubular conduit rolled upon itself in spiral form, a container therefor having a removable end closure, said conduit having inlet and outlet connections for spiral flow of a fluid therethrough, said connections being associated with said closure whereby said conduit coil is carried thereby and removable therewith, and said container having connections for flow of another fluid therethrough outside of said conduit coil.

18. In a heat transfer device of the character described, the combination of a flat tubular conduit rolled upon itself in spiral form, a container therefor having a removable end closure, said conduit having inlet and outlet connections for spiral flow of a fluid therethrough, said connections being associated with said closure, whereby said conduit coil is carried thereby and removable therewith, said container having connections for flow of another fluid therethrough outside of said coil, and filter means carried by said closure and arranged in circuit with said conduit.

19. In a heat transfer device of the character described, the combination of a flat tubular conduit rolled upon itself in spiral form, a container therefor having a removable end closure, said conduit having inlet and outlet connections for spiral flow of a fluid therethrough, said connections being associated with said closure, whereby said conduit coil is carried thereby and removable therewith, said container having connections for flow of another fluid therethrough outside of said coil, and filter means carried by said closure and arranged in circuit with said conduit and fitting within said coil thereof.

LEO M. MONROE.